US012811042B2

(12) United States Patent
Krave

(10) Patent No.: US 12,811,042 B2
(45) Date of Patent: Nov. 24, 2026

(54) BIFILAR COIL WINDING FOR FAST QUENCH PROTECTION AND RELATED SYSTEMS AND METHODS

(71) Applicant: FERMI RESEARCH ALLIANCE, LLC, Batavia, IL (US)

(72) Inventor: Steven T. Krave, Sugar Grove, IL (US)

(73) Assignee: FERMI FORWARD DISCOVERY GROUP, LLC, Chicago, IL (US)

( * ) Notice: Subject to any disclaimer, the term of this patent is extended or adjusted under 35 U.S.C. 154(b) by 164 days.

(21) Appl. No.: 18/796,654

(22) Filed: Aug. 7, 2024

(65) Prior Publication Data

US 2026/0045396 A1 Feb. 12, 2026

(51) Int. Cl.
*H01F 6/02* (2006.01)

(52) U.S. Cl.
CPC .................................... *H01F 6/02* (2013.01)

(58) Field of Classification Search
CPC ........................................................ H01F 6/02
USPC ........................................................ 361/117
See application file for complete search history.

(56) References Cited

U.S. PATENT DOCUMENTS 7,283,339 B2 10/2007 Tekletsadik
2014/0066312 A1* 3/2014 Kasten ............... G01R 33/3815 505/211
2022/0416649 A1* 12/2022 Badcock ................ H03K 17/92
2023/0298790 A1* 9/2023 Markiewicz .............. H01F 6/06 361/141

FOREIGN PATENT DOCUMENTS

EP 3014634 A1 5/2016
JP 2021180280 A * 11/2021

OTHER PUBLICATIONS

Bi-Filar Coil Winding for Fast Quench Protection by Steven Krave and Vittorio Marinozzi, https://ieeexplore.ieee.org/document/10481674.

(Continued)

*Primary Examiner* — Sreeya Sreevatsa
(74) *Attorney, Agent, or Firm* — William A. Harding; Grable Martin PLLC

(57) ABSTRACT

A quench protection system, and associated methods of manufacturing and operating the same, including a bifilar coil defined by first and second insulated conductors co-wound to form a persistent current loop. A first coil splice electrically connects the first insulated conductor start-to-end to the second insulated conductor; and a second coil splice electrically connects the second insulated conductor start-to-end to the first insulated conductor. First and second current leads electrically connect to the first and second coil splices, respectively. An input current received by the first current lead (e.g., from a power supply or a capacitor) is split by the first coil splice into a first portion passed clockwise through the first insulated conductor and into a second portion passed counterclockwise through the second insulated conductor, to define a parallel differential mode. The bifilar coil in the parallel differential mode may be characterized by an inductance L of approximately 0.

20 Claims, 15 Drawing Sheets

(56) References Cited

OTHER PUBLICATIONS

M. Mentink, A. Dudarev, T. Mulder, J. van Nugteren and H. ten Kate, “Quench protection of very large, 50 GJ class and and high-temperature superconductor based detector magnets,” IEEE Transactions on Applied Superconductivity, vol. 26, pp. 1-8, 2016.
M. Now and M. Steurer, “High-temperature superconductor fault current limiters: concepts, applications, and development status,” Superconductor Science and Technology, vol. 20, No. 3, p. R15, 2007.
E. Ravaioli, B. Auchmann, G. Chlachidze, M. Maciejewski, G. Sabbi, S. Stoynev and A. Verweij, “Modeling of Interfilament Coupling Currents and Their Effect on Magnet Quench Protection,” IEEE Transactions on Applied Superconductivity, vol. 27, No. 4, 2017.
G. Ambrosio and et al., “MQXFA Final Design Report,” US HL-LHC Accelerator Upgrade Project, 2022.
E. Ravaioli, CLIQ. A new quench protection technology for superconducting magnets, 2015.

* cited by examiner

BIFILAR COIL WINDING FOR FAST QUENCH PROTECTION AND RELATED SYSTEMS AND METHODS

STATEMENT REGARDING FEDERALLY SPONSORED RESEARCH OR DEVELOPMENT

The invention described in this patent application was made with Government support under the Fermi Research Alliance, LLC, Contract Number DE-AC02-07CH11359 awarded by the U.S. Department of Energy. The Government has certain rights in the invention.

FIELD OF THE INVENTION

The present invention relates generally to protection of advanced magnets and, more particularly, to systems and methods for quench protection as applied in superconducting magnet technology.

Background of the Invention

As a matter of definition, an electromagnet typically comprises a core of conductive material (such as iron) surrounded by conductive wire arranged in coils through which an electric current is passed to magnetize the core (thereby inducing a magnetic field). A superconducting electromagnet employs coils made of superconducting wire to produce strong magnetic fields without loss of energy from electrical resistance. To operate, a superconducting electromagnet must be cooled to a cryogenic temperature, referred to as the critical temperature ($T_c$), at which the magnet leaves a normal resistive state (normal state) and enters a state of superconductivity possessing high electrical currents and producing high magnetic fields. High-temperature superconductors (HTS) are a category of superconducting material that have a $T_c$ above 77 Kelvin (K), often made from rare-earth barium copper oxides (REBCO). As superconducting magnet technology is pushed towards higher performance, energy density and total stored energy follow exponentially. However, with higher performing magnet designs comes challenges in protecting the superconducting magnets from various forms of degradation.

A notable form of degradation that must be considered for superconducting electromagnet design is a quench event. As a matter of definition, "quenching" a "a quench" is an event during which a rise in temperature in a section of a superconducting electromagnetic coil introduces electrical resistance to the coil, thereby returning the system to the normal state. This transition, in turn, disturbs the magnetic field and electrical current running through the coil, which not only compromises desired system operation but also potentially causes mechanical damage.

Certain known methods of quench protection involve employment of quench heaters. Upon detecting a quench, a quench heater preemptively passes a current through a protected coil to return the coil to the normal resistive state so that heat resulting from the quench is distributed across the coil, thereby reducing potential damage. Newer quench protection technologies such as Coupling Loss Induced Quench (CLIQ) employ coupling losses to generate heat in a coil to cause transition to the normal state. An exemplary CLIQ system may comprise a capacitor discharged across magnet coils, leading to coupling losses from the large induced current di/dt and minor corresponding magnetic field constant in time dB/dt. However, both these known design approaches for superconducting magnet quench protection commonly present challenges, such as inductance limitations, size limitations, and: response time limitations.

Accordingly, a need exists for a solution to at least one of the aforementioned challenges in superconducting magnet design. For instance, an established need exists for improvements in the state of the art for quench protection of superconducting magnetic systems that are not inductance limited in large magnet strings or at low field, thus allowing less complex configurations.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to systems and methods of employing multi-filar coil winding for protecting a superconducting magnetic from sudden quench events.

In certain embodiments of the present invention, a quench protection system may comprise a first insulated conductor and a second insulated conductor, each characterized by a respective starting end and terminating end. The first and second insulated conductors may be co-wound to define a bifilar coil. Because the first insulated conductor and the second insulated conductor may exist in nearly the same space, these conductors may exhibit magnetic coupling with a coupling coefficient K of greater than 0.9. The bussing type of the bifilar coil may be one of parallel wound, series connected; parallel wound, parallel connected; counter wound (series); and counter wound (parallel).

A method aspect of manufacturing the quench protection system described hereinabove may further comprise electrically connecting the starting end of the first insulated conductor with the terminating end of the second insulated conductor, to define a first coil splice; and also electrically connecting the starting end of the second insulated conductor with the terminating end of the first insulated conductor, to define a second coil splice. So configured, the bifilar coil may represent a persistent current loop. The quench protection system may further comprise first and second current leads, with the first current lead electrically connected to the bifilar coil proximate the first coil splice; and the second current lead electrically connected to the bifilar coil proximate the second coil splice.

A method aspect of operating the quench protection system described hereinabove may comprise receiving, using the first current lead, an input current (e.g., from a power supply or a capacitor). The first coil splice may pass a first portion of the input current clockwise through the first insulated conductor and, substantially simultaneously, may pass a second portion of the input current counterclockwise through the second insulated conductor, to define a parallel differential mode. The bifilar coil in the parallel differential mode may be characterized by an inductance L of approximately 0.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Certain embodiments of the superconducting magnet design of the present invention are now described in detail. Throughout this disclosure, the present invention may be referred to as a quench protection system, a quench protection assembly, a quench protector, an electromagnet quench protection assembly, a bifilar coil quench protector, a magnet, an assembly, a device, a system, a product, and/or a method for protecting a superconducting magnet from quench events. Those skilled in the art will appreciate that this terminology is only illustrative and does not affect the scope of the invention. For instance, the present invention may just as easily relate to means to energizing a persistent current in various magnet designs.

Figure 1:
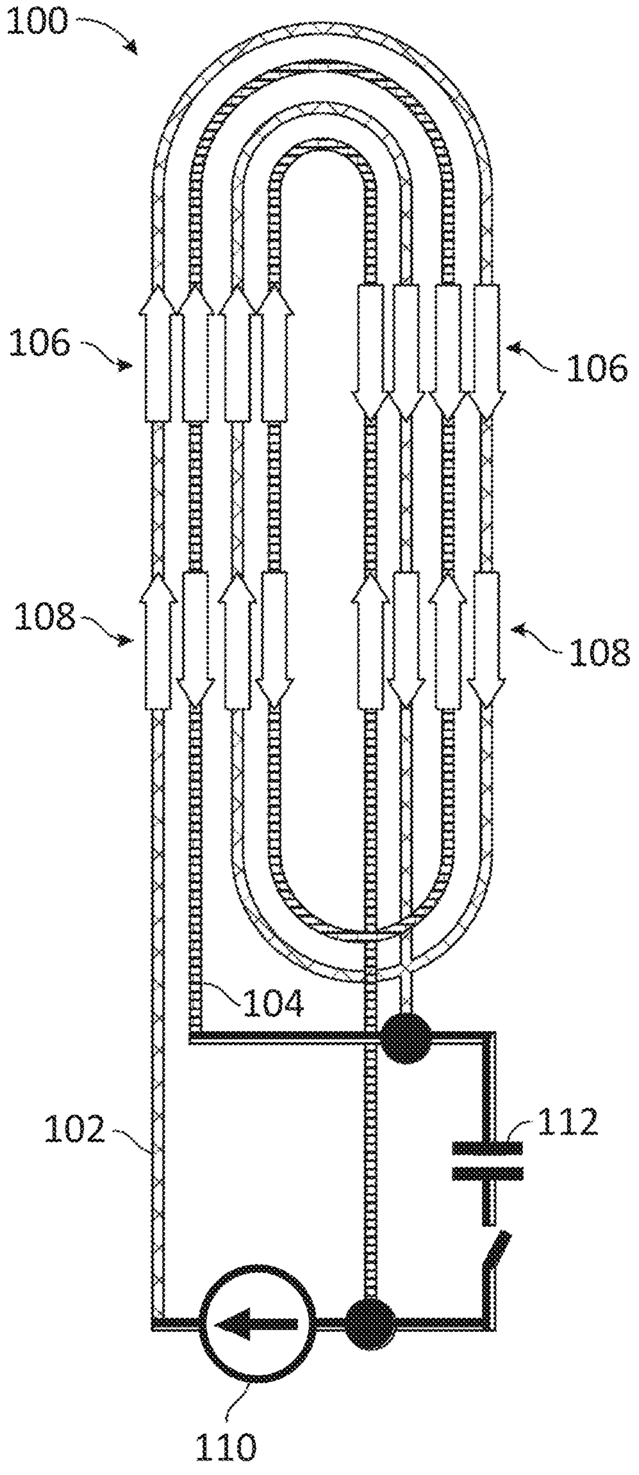
FIG. 1 is a schematic diagram of a generalized bifilar coil layout according to an embodiment of the present invention.

Generally speaking, embodiments of the present invention may involve techniques for using a multi-filar approach to coil winding, along with bussing techniques, to allow for substantial degrees of freedom in electromagnet design. Referring initially to FIG. 1, a generalized bifilar coil layout 100 may comprise two independently insulated conductors 102, 104 (also referred to herein as coils) that may be wound concurrently and coextensively. A current source 110 may be electrically connected to a starting end of insulated conductor 102 and a terminating end of insulated conductor 104. A capacitor 112 may be electrically connected to a starting end of insulated conductor 104 and a terminating end of insulated conductor 102. Such a configuration may deliver both standard currents 106 and discharge currents 108 along the paired insulated conductors 102, 104.

Because the multiple insulated conductors 102, 104 occupy nearly the same space (i.e., $M \approx L$, where M is mutual inductance, a measure of the inductance shared between coils; and L is inductance, a measure of energy stored in a magnetic field), the conductors 102, 104 may exhibit very tight magnetic coupling with high mutual inductance M and with coupling coefficient K (i.e., a unitless measure of coupling between 0 and 1) values of 0.9 or higher being reasonable to achieve, depending on overall geometry. A coil wound with two conductors may allow for a limited set of general configurations with a single power supply, which may be generalized as the following sets of series/parallel inductors with close coupling: single coil powered, series powered (additive), series powered (differential), parallel powered (additive), and parallel powered (differential).

While any configuration may find use in certain applications, for the purpose of the non-inductive mode, at least two are of particular utility: the series additive mode and the differential parallel mode. In the series additive mode, the amp-turns may add and generate a magnetic field in the normal fashion. The system inductance in the configuration may be equal to the standard coil inductance, and a magnetic field may be generated as normal. In the differential parallel mode, power may be applied across both windings, with one coil amp-turns cancelling the other without generating a substantial net magnetic field. This phenomenon is essentially a dead short, with some minimal inductance contributed by leakage inductance in the system. This configuration is in some ways analogous to a resistive superconducting fault current limiter (r-SFCL) with an additional transport current.

Referring now to the electrical schematic of FIG. 2, a quench protection system 200 implemented as a CLIQ modified with a bifilar coil configuration according to an embodiment of the present invention will now be described in detail. Similar to the generalized bifilar coil layout 100 of FIG. 1, a current source 210 may be electrically connected to a starting end of insulated conductor 202 (as shown, Coil A) and a terminating end of insulated conductor 204 (as shown, Coil B). A capacitor 212 may be electrically connected to a starting end of insulated conductor 204 and a terminating end of insulated conductor 202. Such a configuration may deliver both standard currents and discharge currents along the paired insulated conductors 202, 204. A person of skill in the art will immediately recognize that quench protection system 200 may be electrically similar to CLIQ configurations known in the art, with the advantageous addition of a high coupling coefficient between coils 202, 204. The switch 214 shown may be triggered by the protection system in the event of a quench condition.

Certain embodiments of the bifilar quench protection system 200 may allow a superposition of cancelled currents on top of the magnet transport configuration without an inductive penalty. Such a configuration may make possible the driving of substantial current di/dt in one coil, provided that the opposite condition is met in the other coil(s) with or without the present of a typical transport current. To drive this current di/dt, a "small" voltage may be required. This voltage may come from an external source 213 such as a capacitor circuit, as shown in FIG. 2; or from interrupting the coil transport current in one coil loop, while allowing bypass, such as through a diode 211, in the other coil loop. If provided using an external capacitor bank, a third power lead may be brought to the joint between coils, as is done with CLIQ.

Figure 2:
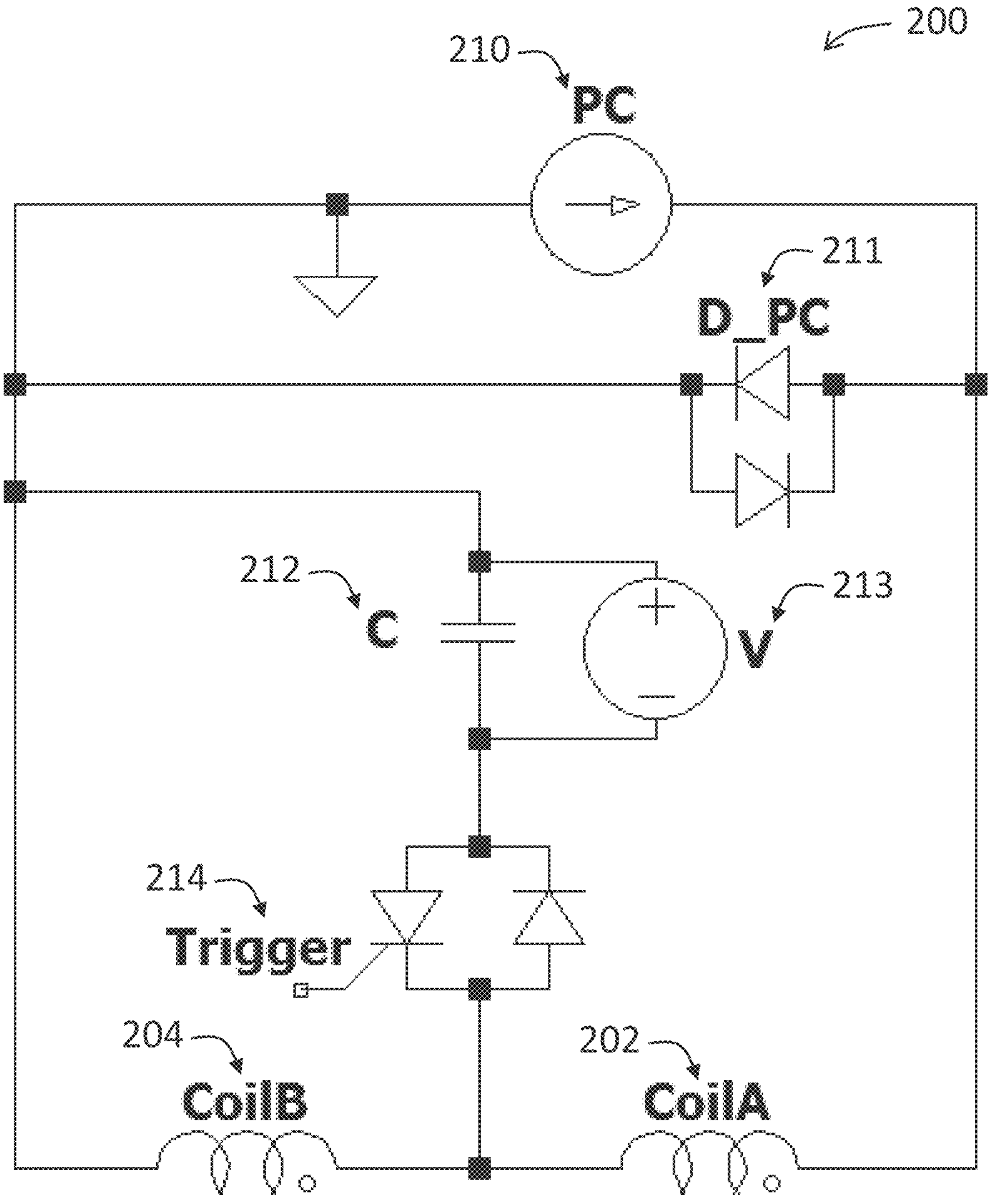
FIG. 2 is a schematic diagram of a quench protection system implemented as a CLIQ modification according to an embodiment of the present invention.

Still referring to FIG. 2, in normal operation, operation current may flow around the outside of the loop generating field as normal. In protection mode, the capacitor 212 may induce counterflowing current in the coils 202, 204 with any needed power convertor current passing through the diodes 211. Because inductance may be near zero, in familiar configurations, current di/dt of tens of mega-amps per second may be produced, resulting in massive transport current increase possibly exceeding the short sample limit, as well as introducing substantial alternating current (AC) losses.

For reference, the peak current di/dt may be calculated by solving Equation (1) below, where V is capacitor charge voltage and L is the differential inductance:

$$V = L * di/dt \tag{1}$$

The peak current di/dt flowing from the capacitor 212 in the ideal case, neglecting lead resistances and dynamic effects, may be estimated by conservation of energy by solving for the capacitor current I below, where C is capacitance in Farads, V is charge voltage and L is the differential mode inductance in Henries. The peak current in either coil 202, 204 may be one-half of the capacitor 212 current as it is split between coils 202, 204:

$$\frac{1}{2} * C * V^2 = \frac{1}{2} * L * I^2 \tag{2}$$

This design concept may raise certain complications. For example, and without limitation, a minimum of one additional power lead may be required to be connected to the magnet from an external location to pass a massive transport current, albeit for a very short period, as is required in CLIQ. Doing so, however, may introduce an added heat load to the cryostat. Therefore, this at least one additional lead may need to be sized to pass the discharge current without substantially impacting the energy available to the magnet or overheating, while minimizing the associated heat leak to an acceptable level. Temperature rise may be calculated adiabatically in the same fashion as the hot-spot temperature.

Additionally, the large additional transport current provided to the magnet may generate some additional forces within the coil. The bulk change in force of the magnet may be near zero as ampere turns in the magnet remain approximately constant, as any positive current in one turn is equal but opposite current in the adjacent turn. Attractive or repulsive Lorentz forces may be present at individual conductors proportional to dI×B where dI is change in transport current for an individual conductor and B is the magnetic field. The outcome of this force may be uncertain, therefore relation of any internal stresses may be beneficial.

Figure 3:
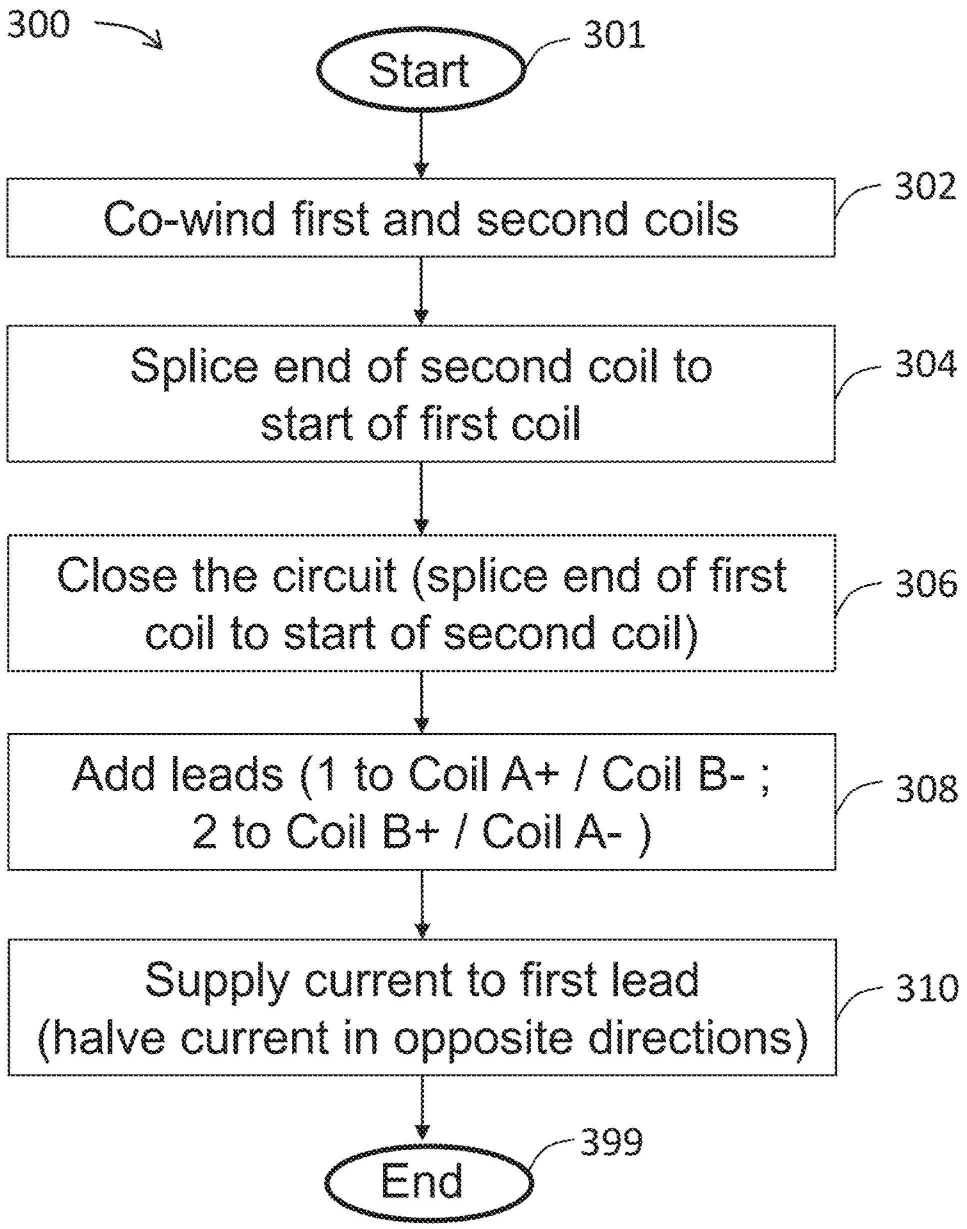
FIG. 3 is a flowchart of a method of manufacturing a quench protection system including bifilar coil winding according to an embodiment of the present invention.

Referring now to FIG. 3, a method of manufacturing 300 a bifilar quench protection system according to an embodiment of the present invention will now be described in detail. FIGS. 4, 5, 7, 8 and 9 illustrate various states of system assembly at distinct steps of the method 300 of FIG. 3.

Figure 4:
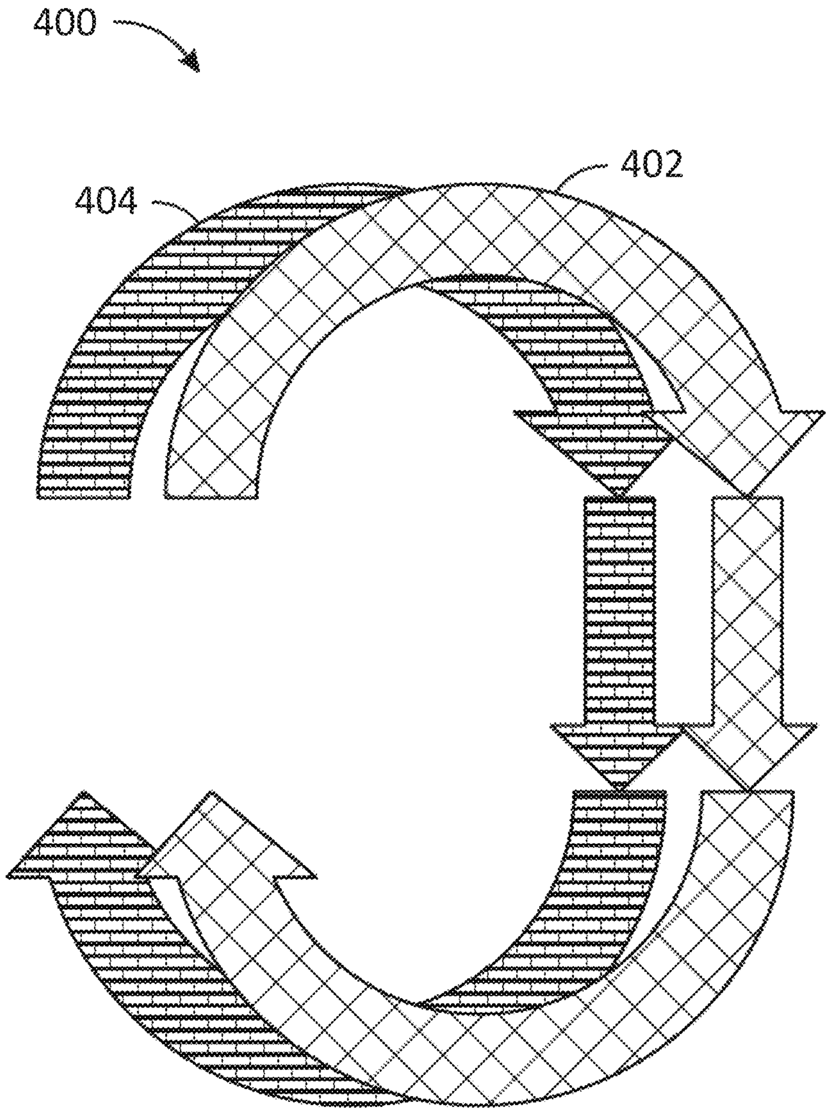
FIG. 4 is a schematic diagram depicting bifilar coextensive coils per the co-wind first and second coils subprocess of FIG. 3.

From the start at Block 301 of FIG. 3, method 300 may comprise co-winding two insulated coils (Block 302). For simplicity, this winding state 400 is illustrated in FIG. 4 as comprising one turn of a first coil 402 and of a second coil 404. However, a person of skill in the art will immediately recognize that co-winding (Block 302) may comprise any number of turns of the co-extensive first and second coils 402, 404.

Figure 5:
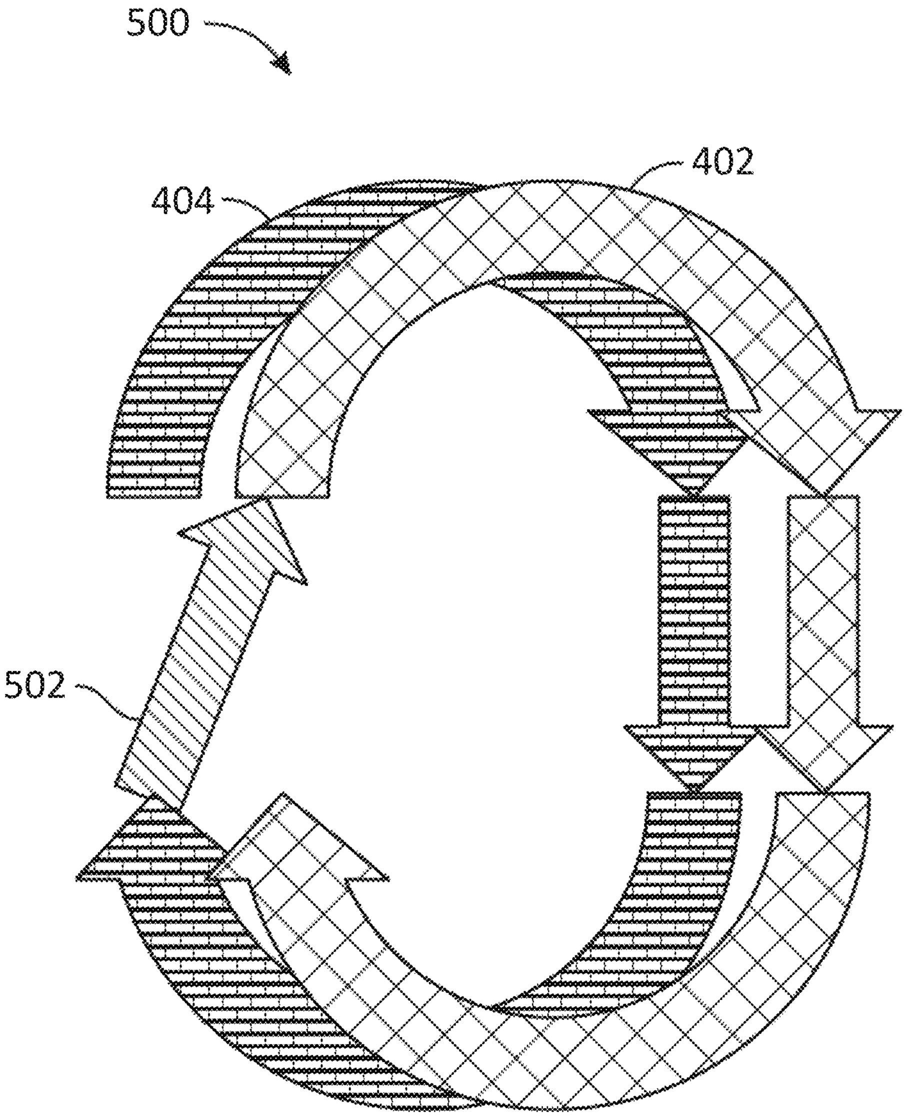
FIG. 5 is a schematic diagram depicting the bifilar co-wound coils of FIG. 4 singularly spliced together per the splice end of second coil to start of first coil subprocess of FIG. 3.

At Block 304 of FIG. 3, first coil 402 may be spliced to second coil 404, thereby configuring the first and second coils 402, 404 in series. As illustrated in FIG. 5, this first splicing state 500 is characterized by a first splice 502 that may complete electrical communication from an end of the second coil 404 to a start of the first coil 402.

Figure 6:
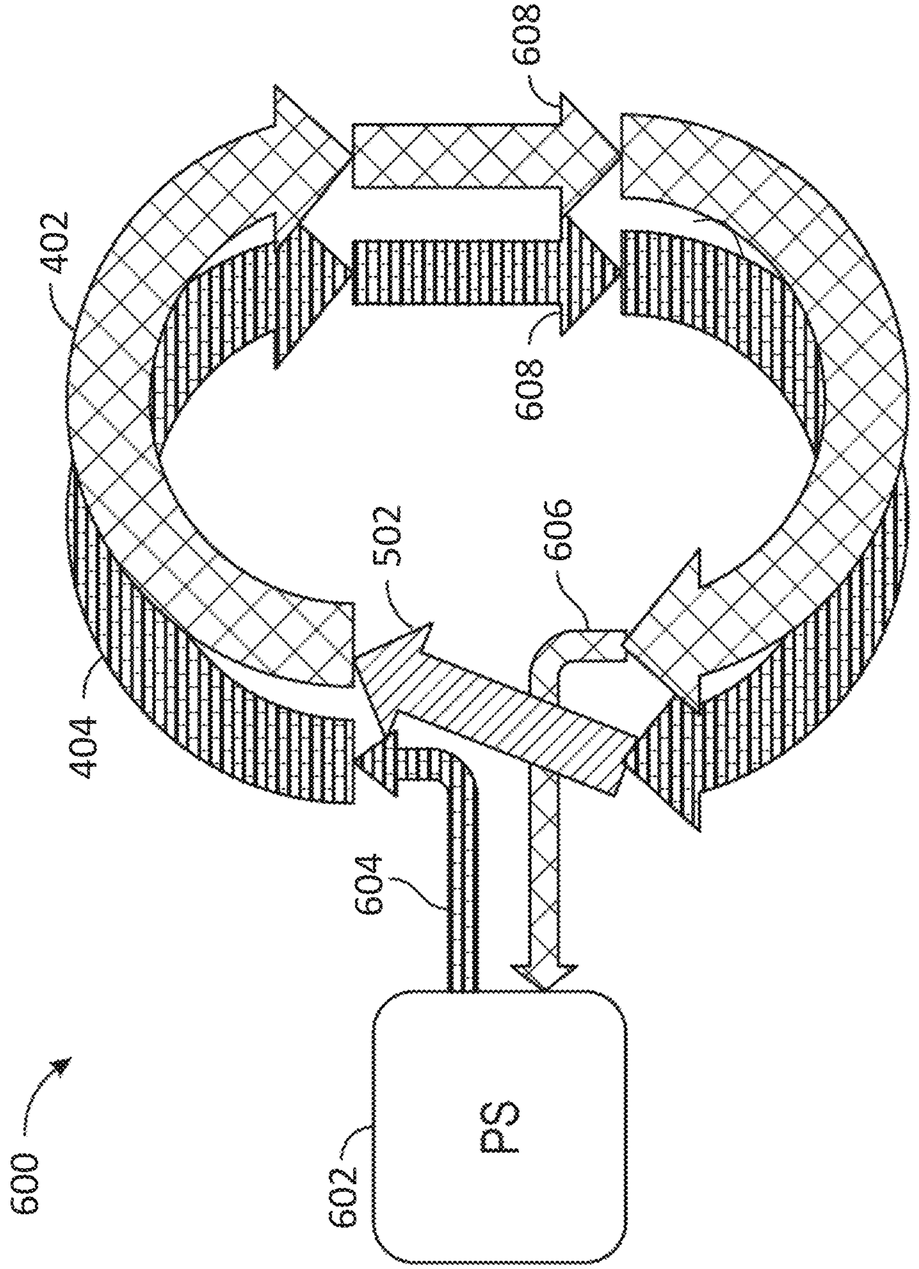
FIG. 6 is a schematic diagram depicting the singularly spliced bifilar co-wound coils of FIG. 5 coupled to a power supply per the close the circuit subprocess of FIG. 3.

At Block 306 of FIG. 3, a circuit including first splicing state 500 of FIG. 5 may be closed as shown in exemplary current flow 600 of FIG. 6, for example, and without limitation, by adding of a power supply 602 along with input lead 604 (as shown, connected to the start of second coil 404) and output lead 606 (as shown, connected to the end of first coil 402). Providing a current from the power supply 602 may result in a primary field generating current 608 in the direction of the arrows on the first and second coils 402, 404 and on the first splice 502 (see also FIGS. 4 and 5). In steady state operation, the exemplary power supply 602 may only provide voltage to make up for losses and may generally be ignored for actual design purposes.

Figure 7:
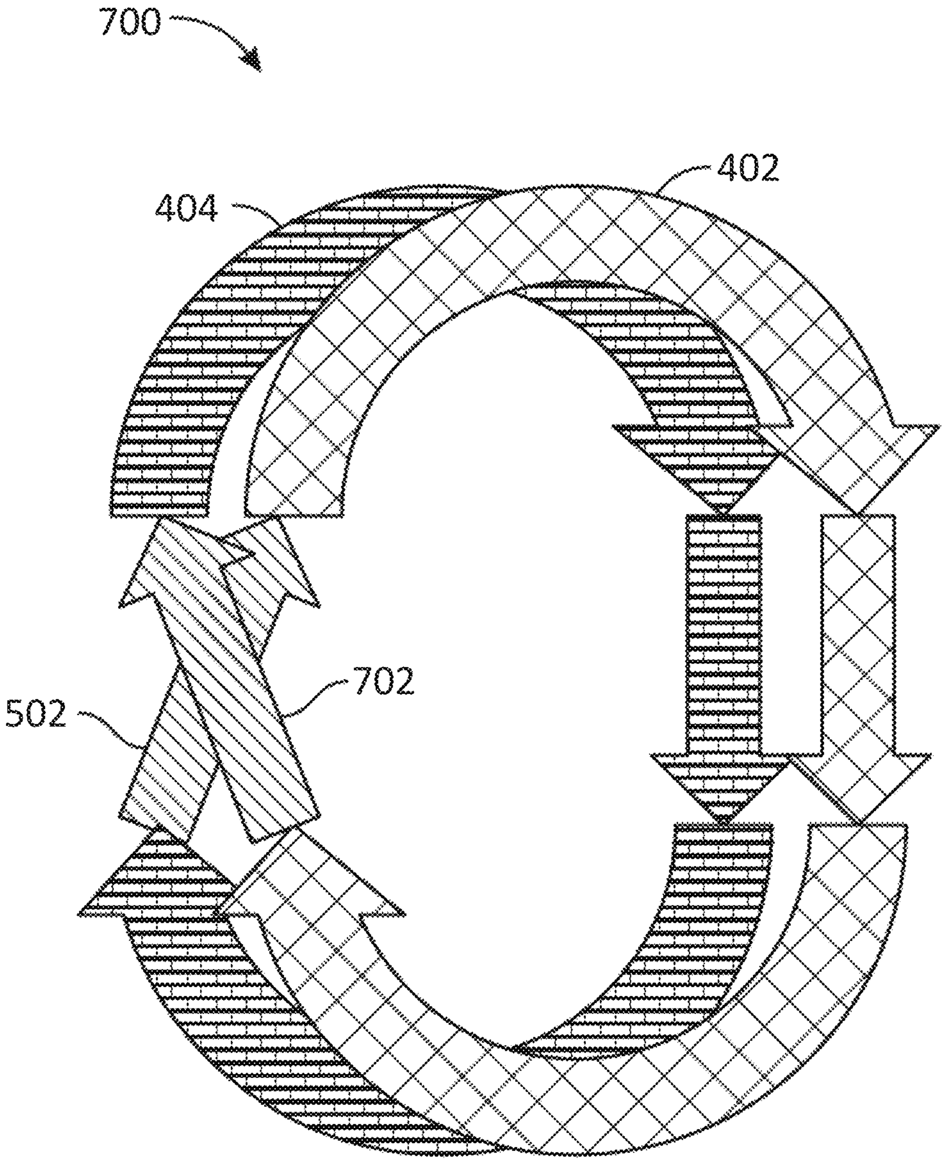
FIG. 7 is a schematic diagram depicting simplified cross-spliced bifilar co-wound coils per the close the circuit subprocess of FIG. 3.

Ignoring power delivery as described above, and still referring to Block 306 of FIG. 3, a circuit including first splicing state 500 of FIG. 5 may be closed by adding a second splice between the first and second coils 402, 404. As illustrated in FIG. 7, this second splicing state 700 (also referred to hereinafter as bifilar series configuration 700) may be characterized by a second splice 702 that may complete electrical communication from an end of the first coil 402 to a start of the second coil 404, thereby creating a persistent current loop.

Figure 8:
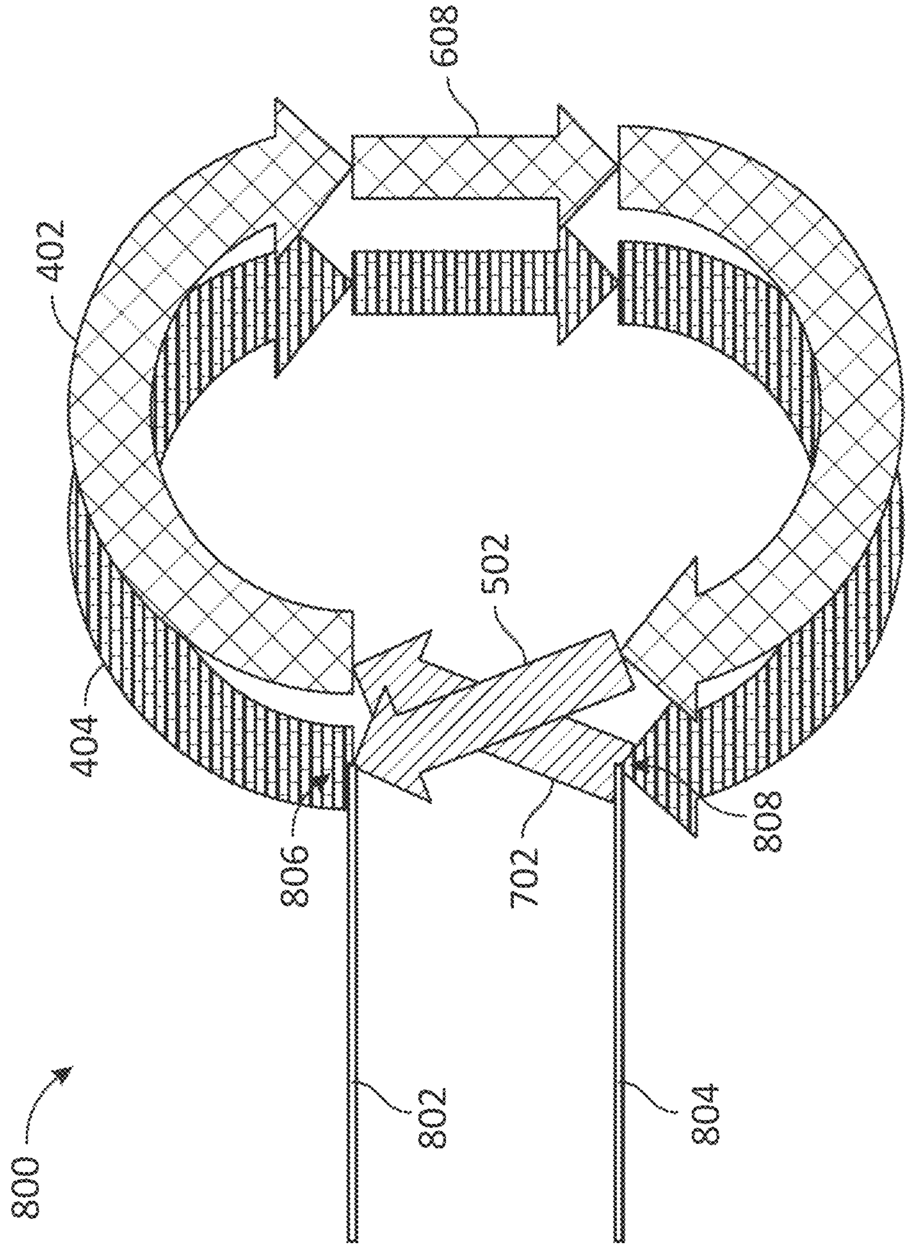
FIG. 8 is a schematic diagram depicting the simplified cross-spliced bifilar co-wound coils of FIG. 7 coupled to first and second leads per the add leads subprocess of FIG. 3.
Figure 9:
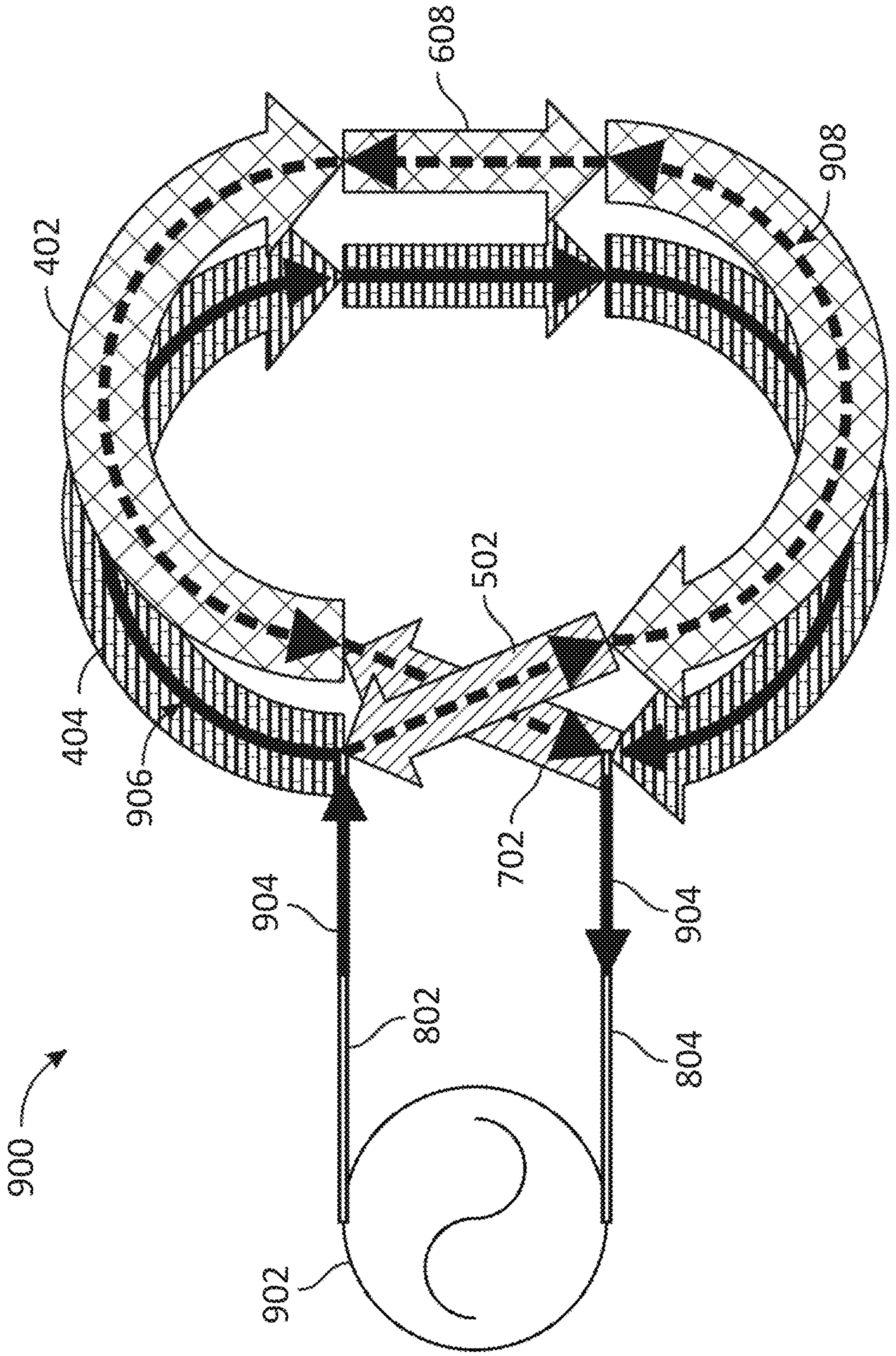
FIG. 9 is a schematic diagram depicting lead-connected cross-spliced bifilar co-wound coils of FIG. 8 coupled to a power supply per the supply current to first lead subprocess of FIG. 3.

At Block 308 of FIG. 3, a pair of leads may be connected in electrical communication with the bifilar series configuration 700 of FIG. 7. As illustrated in FIG. 8, this first powering state 800 may comprise electrically connecting a first current lead 802 to a first electrical connection point 806 between the first splice 502 and the start of the second coil 404; and electrically connecting a second current lead 804 to a second electrical connection point 808 between the end of the second coil 404 and the second splice 702. From this set of current leads 802, 804, second powering state 900 of FIG. 9 illustrates a power supply 902, capacitor, or equivalent means configured to supply a current 904 to both coils 402, 404. More specifically, the current 902 may split at the first electrical connection point 806 with half the current flowing in the clockwise direction 906 and the remaining half in the counterclockwise direction 908 (referred to hereinafter as parallel differential mode, where inductance ≈0). In certain embodiments of the present invention, this parallel differential mode may be superposed on the series connected mode.

Figure 10:
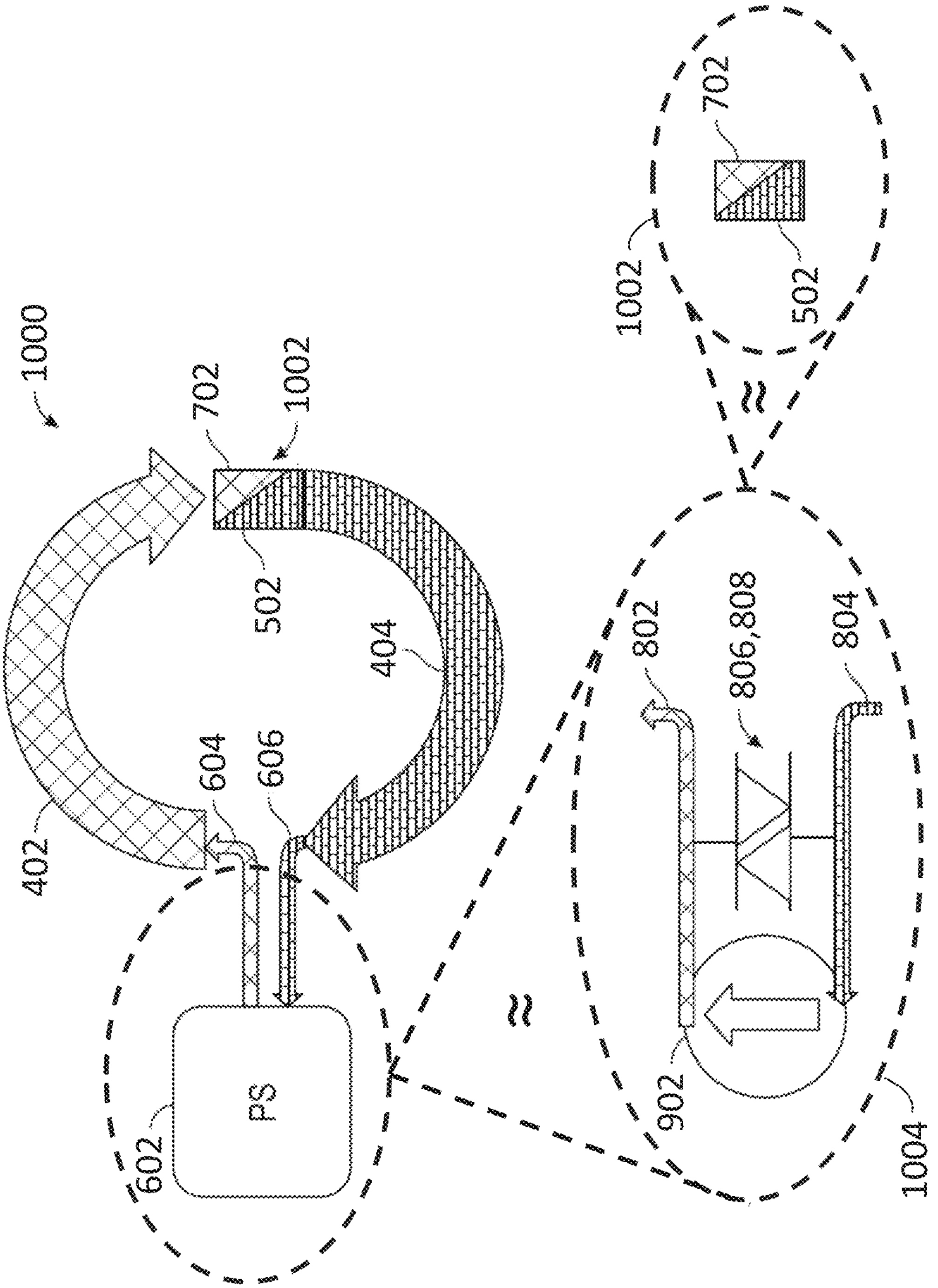
FIG. 10 is a schematic diagram depicting the singularly spliced bifilar co-wound coils of FIG. 5 in simplified notation and as functionally reduced to the simplified cross-spliced bifilar co-wound of FIG. 7.

Referring now to FIG. 10, the same embodiment described above for FIGS. 4, 5, 6, 7, 8, and 9 is illustrated as simplified schematic 1000, but with overlaps of coils 402, 404 removed for clarity. The power supply 602 (902) may feed one lead 604 (802) of the first (top) coil 402 with current returned through the second (bottom) coil 404. The coils 402, 404 may be spliced 1002 (502, 702) together in series. Again, the power supply 602 in "steady state" operation may only supply voltage to compensate for losses and may be ignored. For design purposes, it may be assumed that some circulating current exists. The power supply 602 (902) may have bidirectional bypass (illustrated in FIG. 10 as assembly 1004). Collectively, this bypass assembly 1004 may be viewed as an additional junction (e.g., splice 1002) and ignored.

Figure 11:
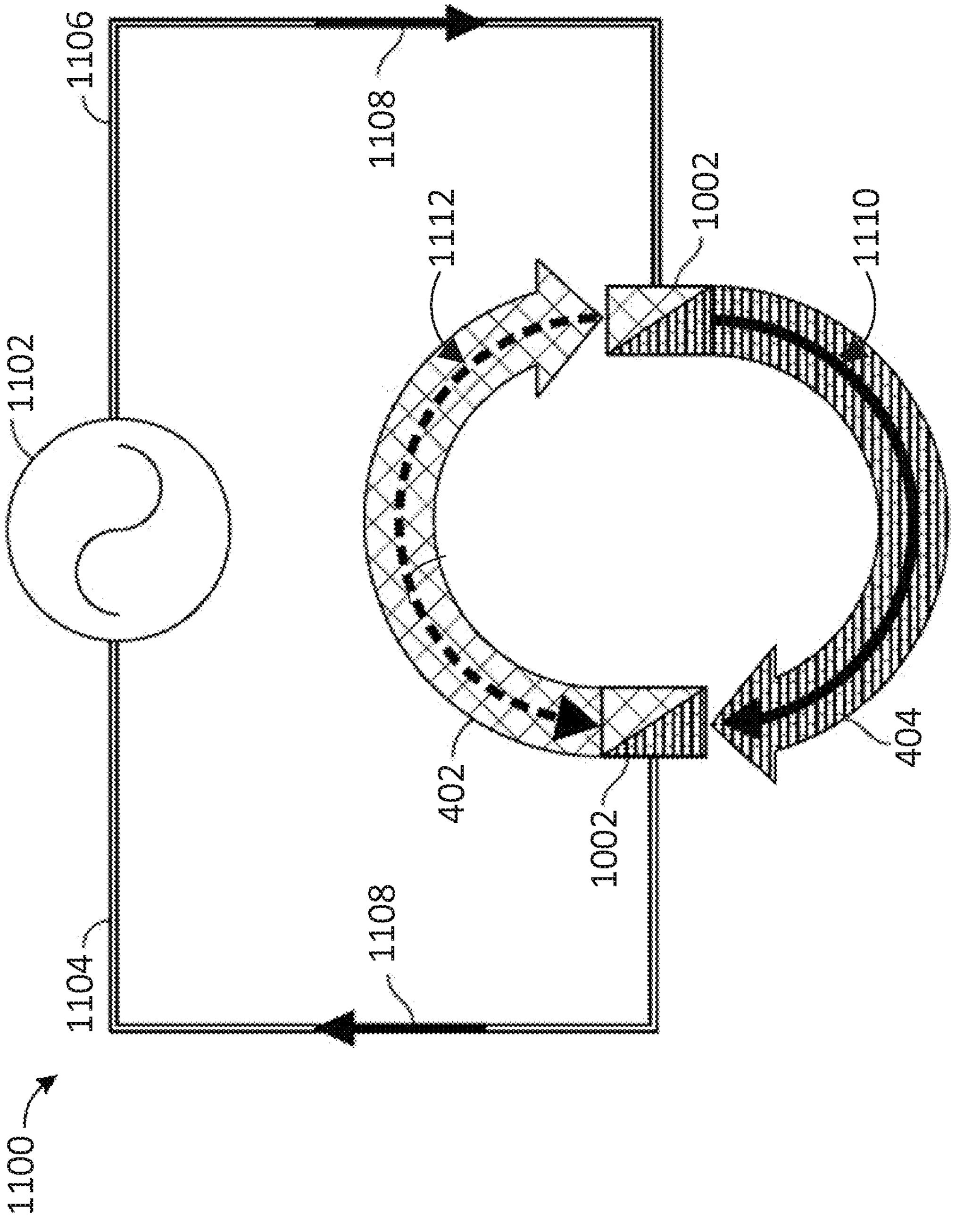
FIG. 11 is a schematic diagram depicting current-supplied cross-spliced bifilar co-wound coils of FIG. 9 in simplified notation and as functionally reduced to the simplified cross-spliced bifilar co-wound of FIG. 7.

Referring now to simplified schematic 1100 of FIG. 11, for example, and without limitation, an additional power supply 1102 may be electrically connected between both coil junctions (splices) 1002 by leads 1104, 1106. The current 1108 supplied by power supply 1102 may split 1110, 1112 between coils 402, 404, respectively, and run in parallel. This illustrates the parallel differential mode where inductance ≈0. This embodied mode nay be superposed on the series connected mode displayed in FIG. 9. The series "persistent" current continues to flow normally (i.e., the circuit so configured is not interrupted).

Figure 12:
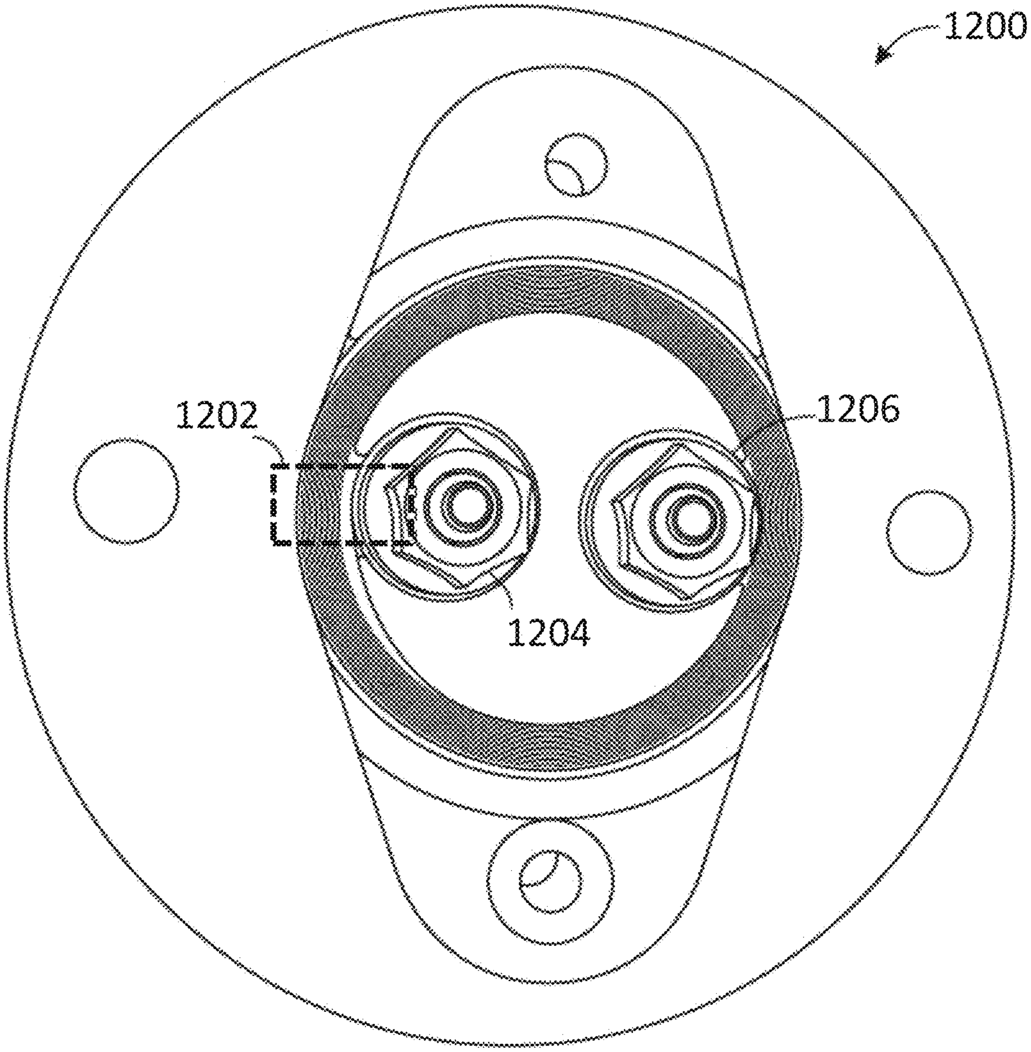
FIG. 12 is a front perspective view of a quench protection system characterized by bifilar coil winding according to an embodiment of the present invention.
Figure 13:
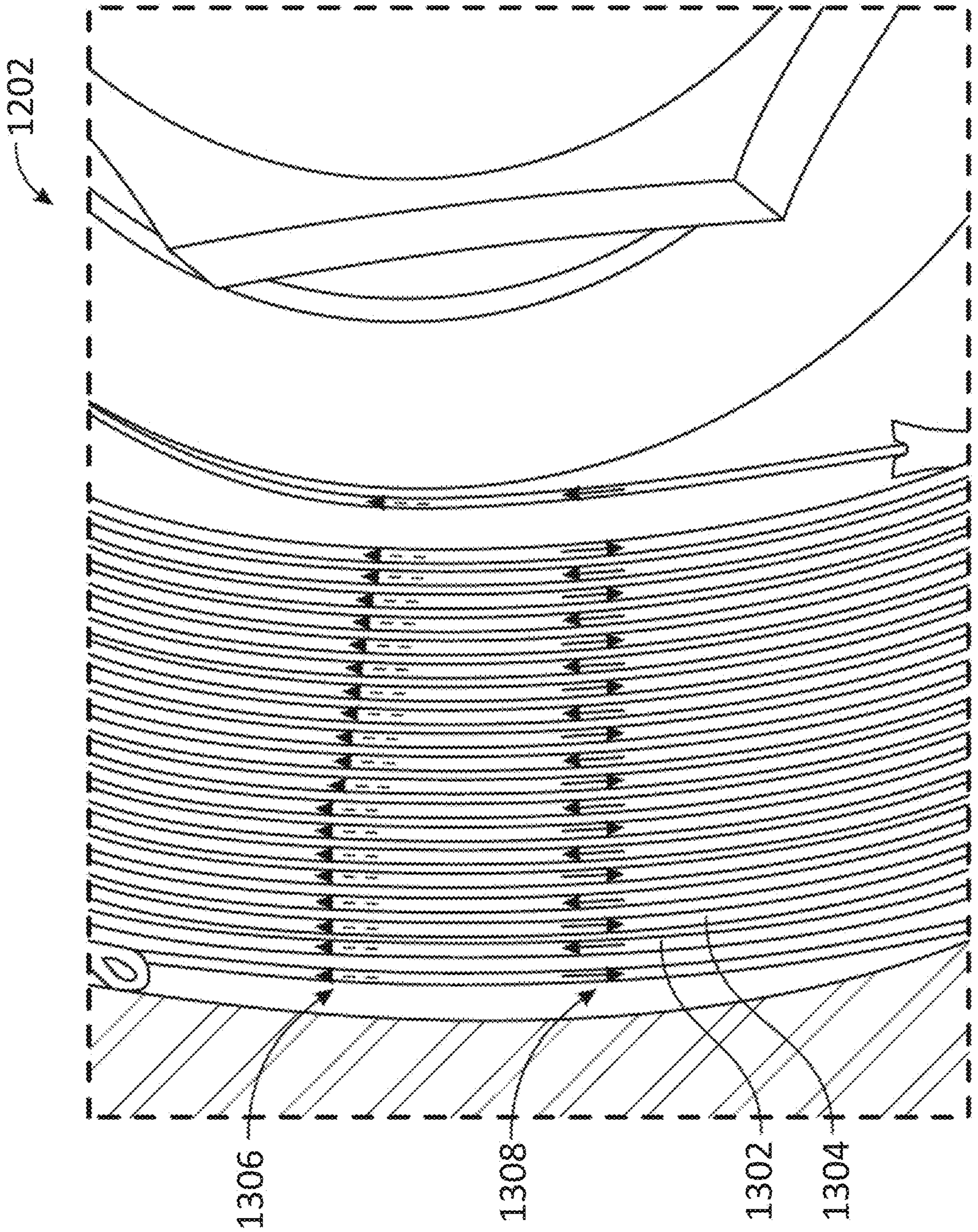
FIG. 13 is an exploded view of a bifilar coil segment of the quench protection system of FIG. 12.

Referring now to FIGS. 12 and 13, a physical design of a bifilar quench protection system according to an embodiment of the present invention will now be described in detail. For example, and without limitation, an HTS solenoid may be adapted for purposes of achieving the status of a bifilar quench protection system. As illustrated in FIG. 12, an exemplary bifilar solenoid 1200 may demonstrate advantageous magnetic coupling between superconducting coils. Bifilar solenoid 1200 may comprise a small magnet designed and fabricated with a pair of co-wound solenoid coils 1202 of 10 millimeter (mm) inner radius and ten (10) turns each (i.e., twenty (20) turns total). A copper bus (not shown) may tie an inner lead 1206 from coil A 1302 to the outer lead 1204 of coil B 1304. Transport current may be applied from the outer lead 1204 of coil A 1302 to the inner lead 1206 of coil B 1304. Such a configuration may deliver the expected standard currents 1306 and discharge currents 1308 along the paired insulated conductors 1302, 1304.

Other geometry, magnetic and powering parameters of exemplary bifilar solenoid 1200 may comprise those outlined in the following Table 1.

TABLE I

| COIL DESIGN PARAMETERS | |
|---|---|
| Geometry Parameters | |
| N Turns (total) | 20 |
| Inner Radius [mm] | 10 |
| $I_{SS}$, 0 T, 77K [A] | 95 |
| Outer Ideal Radius [mm] | 14 |
| Total Conductor Length [m] | 1.51 |
| Magnetic Parameters | |
| $L_{halfcoil}$ (meas, avg 1k-500k) [H] | 3.7E−06 |
| $L_{series}$ (meas, avg 1k-500k) [H] | 13.9E−06 |
| $L_{antiparallel}$ (meas, avg 1k-500k) [H] | 196E−09 |
| K (Coupling Coeff) | 0.97 |
| $M_{Bifi}$ [H] | 3.58E−06 |
| Powering parameters | |
| $V_{charge}$[V] | 5 to 60 |
| C [μF] | 50 to 40000 |
| di/dt @ 0 v | 300E6 Max |

As shown in Table 1, the overall coupling coefficient K for this exemplary bifilar solenoid 1200 may be a reasonable 0.97 based on the remaining (leakage) inductance in the anti-parallel mode, likely because of the relatively large loop area of the leads with respect to the size of the coil. In this example configuration, the mutual inductance between half coils is shown as $M_{bifi}$.

Figure 14:
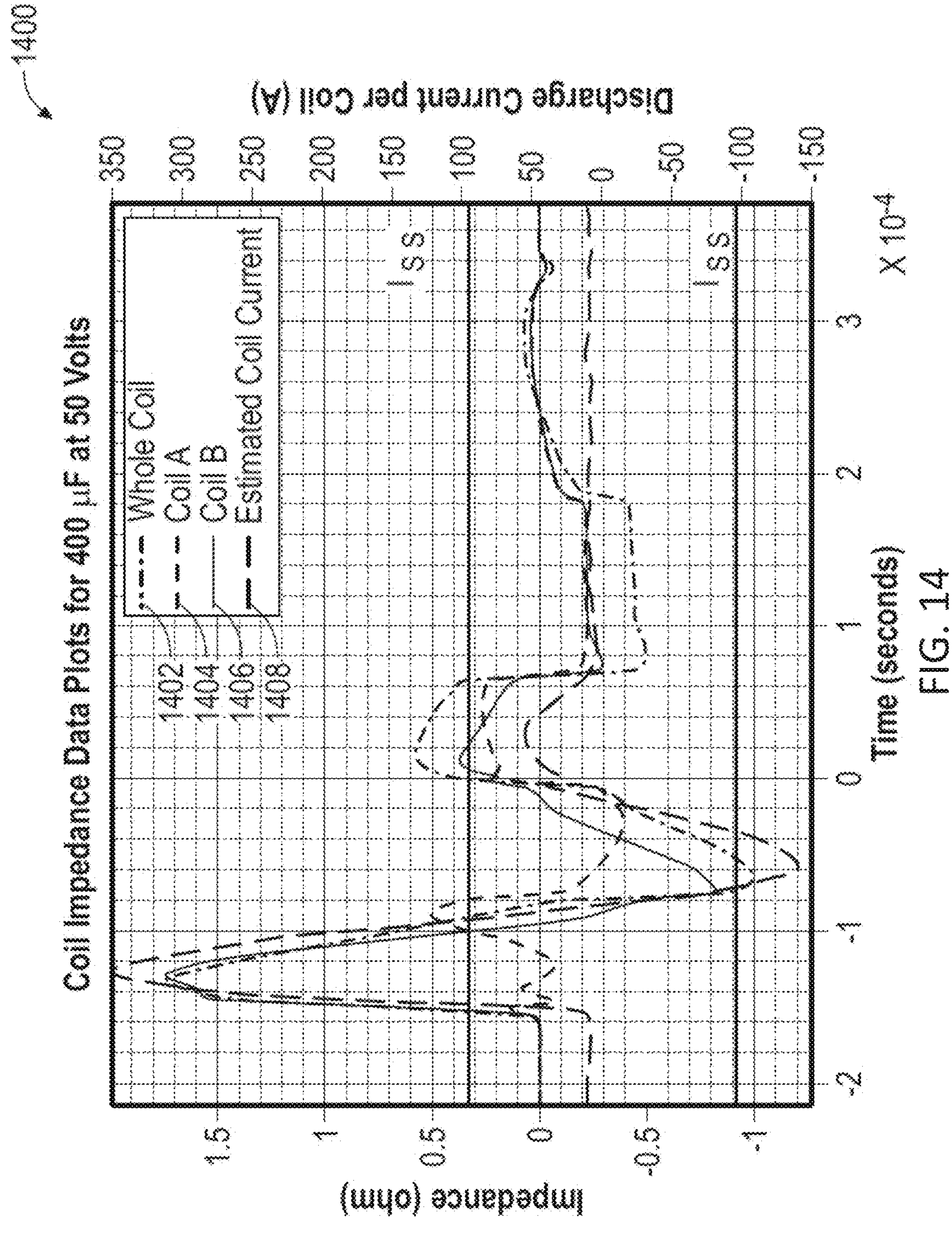
FIG. 14 is a graph of discharge current of the quench protection system of FIGS. 12 and 13 using a low capacitance film capacitor of ~400 μF powering configuration.

Multiple powering configurations applied to this exemplary bifilar solenoid 1200 may exhibit an anticipated peak current di/dt of 300 MA/s. For example, and without limitation, graph 1400 of FIG. 14 illustrates results of discharge into coil with a 400 μF capacitor for oscillation frequency of ~12 kHz. Note that coil impedance as defined in the plots 1404, 1406 is the coil voltage over the normal transport current. This results in the half coil impedance values showing an impact of the discharge which is cancelled in the whole coil 1402 (bucked) signal.

Figure 15:
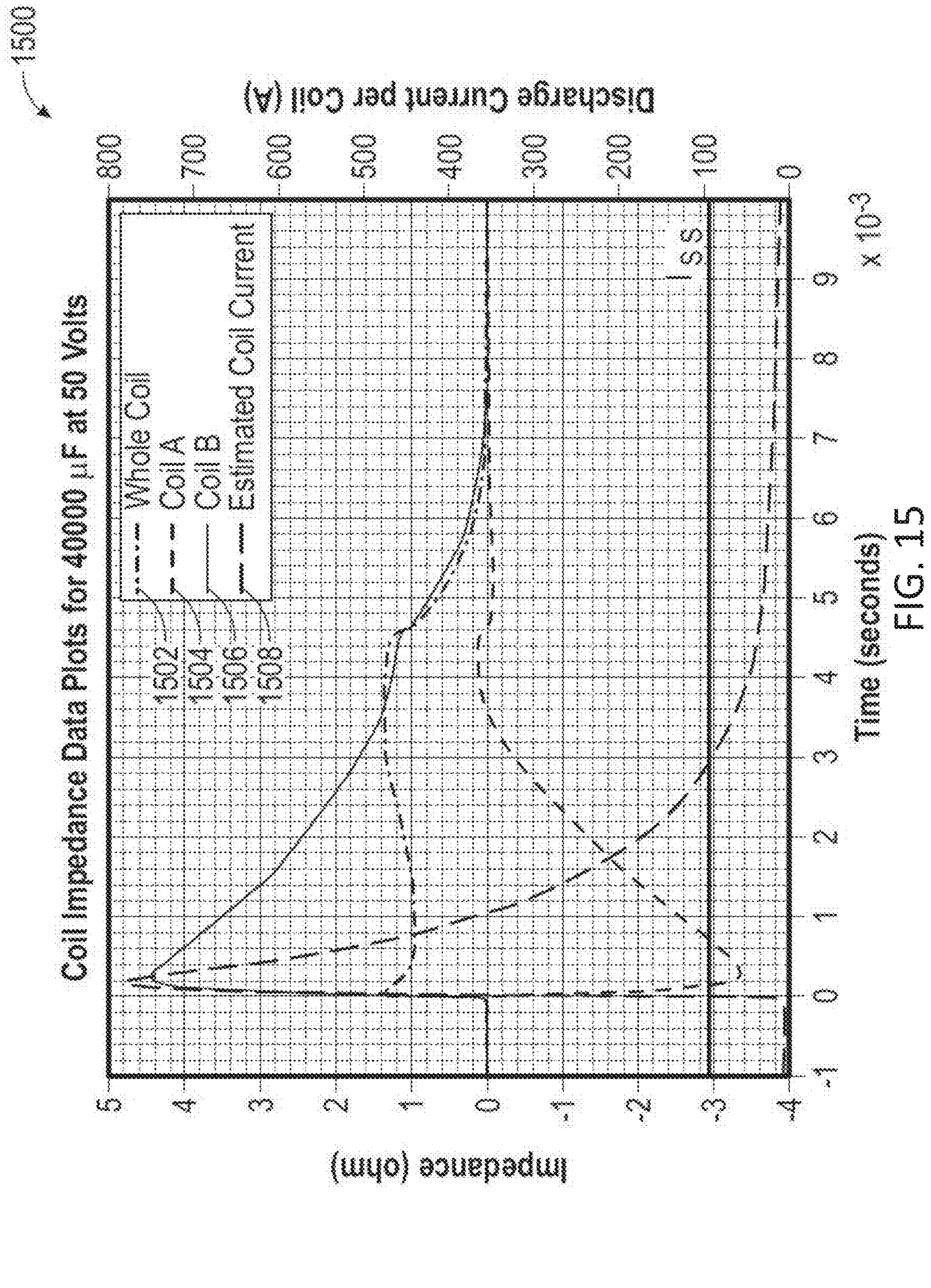
FIG. 15 is a graph of discharge current of the quench protection system of FIGS. 12 and 13 using a 40 mF cap powering configuration.

Also for example, and without limitation, graph 1500 of FIG. 15 illustrates results of discharge using a 40 mF capacitor with no oscillation. A coil resistance of ~1Ω is developed in a few microseconds and is maintained until the coil recovers below short sample limit in a few ms.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced items.

Thus, the scope of the invention should be determined by the appended claims and their legal equivalents, and not by the examples given.

That which is claimed is:

1. A quench protection system comprising:

a first insulated conductor and a second insulated conductor each comprising a starting end and a terminating end, respectively, and co-wound to define a bifilar coil characterized by the starting end of the first insulated conductor configured in electrical communication with the terminating end of the second insulated conductor, to define a first coil splice forming a first fixed, non-switching electrical junction, and the starting end of the second insulated conductor configured in electrical communication with the terminating end of the first insulated conductor, to define a second coil splice forming a second fixed, non-switching electrical junction;

a first current lead configured in electrical communication with the bifilar coil proximate the first coil splice; and a second current lead configured in electrical communication with the bifilar coil proximate the second coil splice;

wherein the bifilar coil is configured to divide a steady state input current into counter-propagating transport-current portions through the first and second insulated conductors.

2. The quench protection system according to claim 1, wherein the bifilar coil is of a persistent current loop type.

3. The quench protection system according to claim 1, wherein the first insulated conductor and the second insulated conductor are magnetically coupled with a coupling coefficient K of greater than 0.9.

4. The quench protection system according to claim 1, wherein the first current lead is further configured to receive the steady state input current; and wherein the first coil splice is configured to pass a first portion of the steady state input current clockwise through the first insulated conductor and, substantially simultaneously, to pass a second portion of the steady state input current counterclockwise through the second insulated conductor, to define a parallel differential mode.

5. The quench protection system according to claim 4, further comprising one of a power supply and a capacitor configured to supply the steady state input current.

6. The quench protection system according to claim 4, wherein the bifilar coil in the parallel differential mode is characterized by an inductance L of approximately 0 resulting from the counter-propagating transport-current portions.

7. The quench protection system according to claim 1, wherein the bifilar coil is of a bussing type selected from the group consisting of parallel wound, series connected; parallel wound, parallel connected; counter wound (series); and counter wound (parallel).

8. A method of manufacturing a quench protection system comprising the steps of:

co-winding a first insulated conductor and a second insulated conductor, to define a bifilar coil;

connecting, in electrical communication, a first starting end of the first insulated conductor with a second terminating end of the second insulated conductor, to define a first coil splice forming a first fixed, non-switching electrical junction;

connecting, in electrical communication, a second starting end of the second insulated conductor with a first terminating end of the first insulated conductor, to define a second coil splice forming a second fixed, non-switching electrical junction;

connecting, in electrical communication, a first current lead to the first coil splice;

connecting, in electrical communication, a second current lead to the second coil splice; and dividing, using the bifilar coil, a steady state input current into counter- propagating transport-current portions through the first and second insulated conductors.

9. The method according to claim 8, wherein the bifilar coil is of a persistent current loop type.

10. The method according to claim 8, wherein the first insulated conductor and the second insulated conductor are magnetically coupled with a coupling coefficient K of greater than 0.9.

11. The method according to claim 8, wherein the dividing the steady state current into the counter-propagating transport-current portions further comprises receiving, using the first current lead, the steady state input current; and passing, using the first coil splice, a first portion of the steady state input current clockwise through the first insulated conductor and, substantially simultaneously, to passing a second portion of the steady state input current counterclockwise through the second insulated conductor, to define a parallel differential mode.

12. The method according to claim 11, further comprising the step of connecting, in electrical communication, to the first coil splice one of a power supply and a capacitor configured to supply the steady state input current.

13. The method according to claim 11, wherein the bifilar coil in the parallel differential mode is characterized by an inductance L of approximately 0 resulting from the counter-propagating transport-current portions.

14. The method according to claim 8, wherein the bifilar coil is of a bussing type selected from the group consisting of parallel wound, series connected; parallel wound, parallel connected; counter wound (series); and counter wound (parallel).

15. A method of operating a quench protection system comprising:

a first insulated conductor and a second insulated conductor each comprising a starting end and a terminating end, respectively, and co-wound to define a bifilar coil characterized by the starting end of the first insulated conductor configured in electrical communication with the terminating end of the second insulated conductor, to define a first coil splice forming a first fixed, non-switching electrical junction, and by the starting end of the second insulated conductor configured in electrical communication with the terminating end of the first insulated conductor, to define a second coil splice forming a second fixed, non-switching electrical junction;

a first current lead configured in electrical communication with the bifilar coil proximate the first coil splice; and a second current lead configured in electrical communication with the bifilar coil proximate the second coil splice;

the method comprising the steps of:

receiving, using the first current lead, a steady state input current; and dividing the steady state input current into counter-propagating transport-current portions through the first and second insulated conductors, by passing, using the first coil splice, a first portion of the steady state input current clockwise through the first insulated conductor, and a second portion of the steady state input current counterclockwise through the second insulated conductor, to define a parallel differential mode.

16. The method according to claim 15, further comprising supplying, using one of a power supply and a capacitor, the steady state input current.

17. The method according to claim 15, wherein the bifilar coil is of a persistent current loop type.

18. The method according to claim 15, wherein the first insulated conductor and the second insulated conductor are magnetically coupled with a coupling coefficient K of greater than 0.9.

19. The method according to claim 15, wherein the bifilar coil in the parallel differential mode is characterized by an inductance L of approximately 0 resulting from the counter-propagating transport-current portions.

20. The method according to claim 15, wherein the bifilar coil is of a bussing type selected from the group consisting of parallel wound, series connected;

parallel wound, parallel connected; counter wound (series); and counter wound (parallel).

* * * * *